United States Patent [19]

Kobayashi et al.

[11] Patent Number: 5,299,663
[45] Date of Patent: Apr. 5, 1994

[54] DISK BRAKE

[75] Inventors: Kinzo Kobayashi, Kanagawa; Shinichi Nakayama, Yamanashi, both of Japan

[73] Assignee: Tokico Ltd., Kanagawa, Japan

[21] Appl. No.: 895,734

[22] Filed: Jun. 9, 1992

[30] Foreign Application Priority Data

Jun. 10, 1991 [JP] Japan .............. 3-043157[U]

[51] Int. Cl.⁵ .............................. F16D 55/224
[52] U.S. Cl. .................... 188/1.11; 188/258; 192/30 W
[58] Field of Search ............ 188/1.11, 73.1, 234, 188/250 B, 250 G, 250 F, 258; 192/30 W, 30 V

[56] References Cited

U.S. PATENT DOCUMENTS 5,060,766 10/1991 Kondo ................... 188/73.1 X

FOREIGN PATENT DOCUMENTS

| 0090134 | 7/1981 | Japan | 188/1.11 |
| 57-115438 | 7/1982 | Japan | |
| 2103737 | 2/1983 | United Kingdom | 188/1.11 |
| 2222646 | 3/1990 | United Kingdom | 188/1.11 |

*Primary Examiner*—Robert J. Oberleitner
*Assistant Examiner*—Josie A. Ballato
*Attorney, Agent, or Firm*—Wenderoth, Lind & Ponack

[57] ABSTRACT

The disk brake includes a caliper having a plurality of claw portions. A carrier supports the caliper for sliding movement in a direction parallel to the axis of rotation of the disk. A pair of pads are disposed on opposite sides of the disk for sliding in the axial direction of the disk. A wear alarm member is attached to one of the pads, which is pressed by the claw portions of the caliper, at a position inbetween the claw portions. The wear alarm member has a mounting portion attached to the pad and a vibrating piece extending from the mounting portion in a direction intersecting the radial direction of the disk. The distal end portion of the vibrating piece is bent toward the disk at the periphery of the pad to form a contact portion.

5 Claims, 3 Drawing Sheets

Fig. 3A
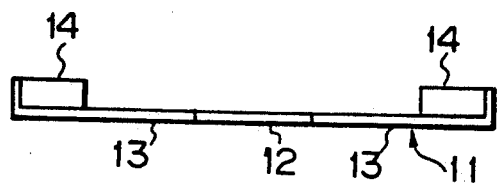
Fig. 3B
Fig. 3C
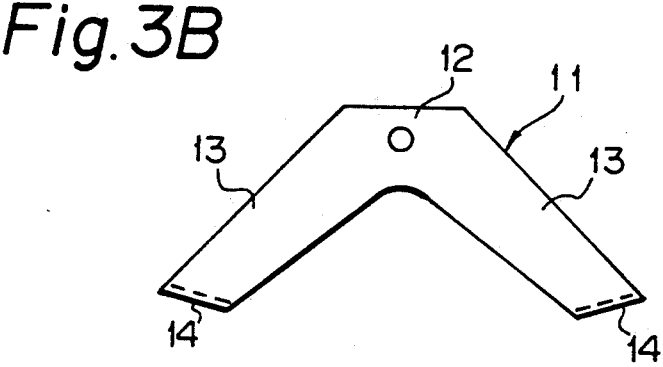
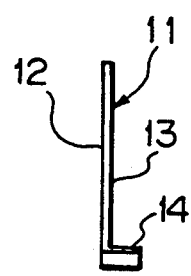
Fig. 4
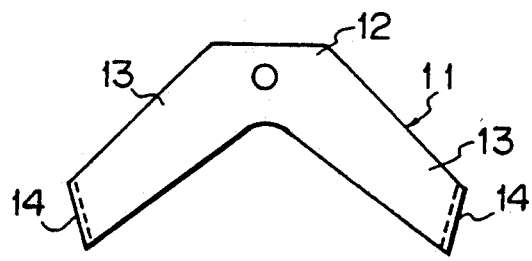
Fig. 5
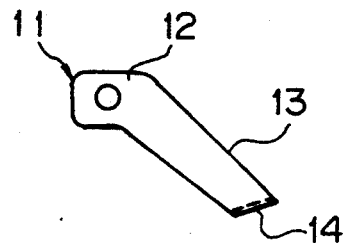

DISK BRAKE

BACKGROUND OF THE INVENTION

1. Field of the Invention

The present invention relates to a disk brake which is attached to a vehicle, for example, an automobile.

2. Description of the Prior Art

In disk brakes, a wear alarm member has heretofore been employed to inform the driver of the wear of the brake pad. This alarm member has a portion that is secured to the support plate of the brake pad, and a contact portion that extends therefrom and bends at the edge of the brake pad support plate so as to extend toward the disk. When the brake pad has become worn, the contact portion comes in contact with the disk and produces sound, thereby giving an audible wear alarm signal to the driver.

The wear alarm member must be sufficiently long to generate vibration effectively. In order to obtain the required length, the conventional wear alarm member is shaped such that the intermediate portion of the member, which is contiguous with the portion secured to the brake pad support plate, is bent to extend away from the disk and then is turned back toward the disk. In order to prevent the portion that extends away from the disk from interfering with a part of the carrier of the disk brake or a claw portion of the caliper, the wear alarm member must be attached to the support plate at a position adjacent to the side edge of the brake pad, and the claw portion needs to be so shaped or positioned as to prevent interference with the wear alarm member. A cut portion may be formed in the claw portion for preventing this interference.

To produce a caliper having a claw portion with a cut portion, a forming die used to produce a caliper having claw portions without a cut portion cannot be used, and it is therefore necessary to modify the die or produce a new die, which invites an increase in the cost.

SUMMARY OF THE INVENTION

It is an object of the present invention to provide a disk brake having a wear alarm member which can be used without the need to modify a claw portion of the caliper.

To this end, the present invention provides a disk brake for a vehicle having a rotary disk, and which comprises: a carrier mounted on a non-rotating part of the vehicle on one side of the disk and including side portions spaced from each other along the circumference of the disk and extending across the disk and an outer beam connecting the side portions on the other side of the disk; a caliper supported by the carrier for sliding movement in the axial direction of the disk and including a cylinder portion on said one side of the disk, a piston received in the cylinder portion, a disk-pass portion extending from the cylinder portion across the disk and claw portions extending from the disk-pass portion on said other side of the disk; a pair of brake pads disposed on the opposite sides of the disk for sliding in the axial direction of the disk, at least one of the pads disposed on said other side of the disk being slidably supported by the carrier; and a wear alarm member attached to the pad on said other side of the disk at a place between the claw portions of the caliper and having a mounting portion secured to the pad, and at least one vibrating piece extending from the mounting portion in a direction intersecting the radial direction of the disk along the pad in the area between the pad and the outer beam of the carrier. The distal end portion of the vibrating piece is bent toward the disk at the periphery of the pad to form a contact portion.

The invention also provides a disk brake for a vehicle having a rotary disk, and which comprises: a carrier mounted on a non-rotating part of the vehicle on one side of the disk; a caliper supported by the carrier for sliding movement in the axial direction of the disk and including a cylinder portion on said one side of the disk, a piston received in the cylinder portion, a disk-pass portion extending from the cylinder portion across the disk and claw portions extending from the disk-pass portion on the other side of the disk; a pair of brake pads disposed on the opposite sides of the disk for sliding movement in the axial direction of the disk, at least one of the pads disposed on said other side of the disk being slidably supported by the carrier; and a wear alarm member attached to the pad on said other side of the disk at a place between the claw portions of the caliper and having a mounting portion secured to the pad, and a pair of vibrating pieces that extend from the mounting portion and diverge in leftward and rightward directions, respectively, to intersect the radial direction of the disk along the pad. The distal end portion of each of the vibrating pieces is bent toward the disk at the periphery of the pad to form a contact portion.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which:

FIG. 3 shows the configuration of a wear alarm member used in the embodiment of the disk brake according to the present invention, in which FIG. 3A is a plan view, FIG. 3B is a front view, and FIG. 3C is a side view;

FIG. 4 is a front view of a wear alarm member in another embodiment of the disk brake according to the present invention;

FIG. 5 is a front view of a wear alarm member in still another embodiment of the disk brake according to the present invention;

DETAILED DESCRIPTION OF THE PREFERRED EMBODIMENTS

Figure 6:
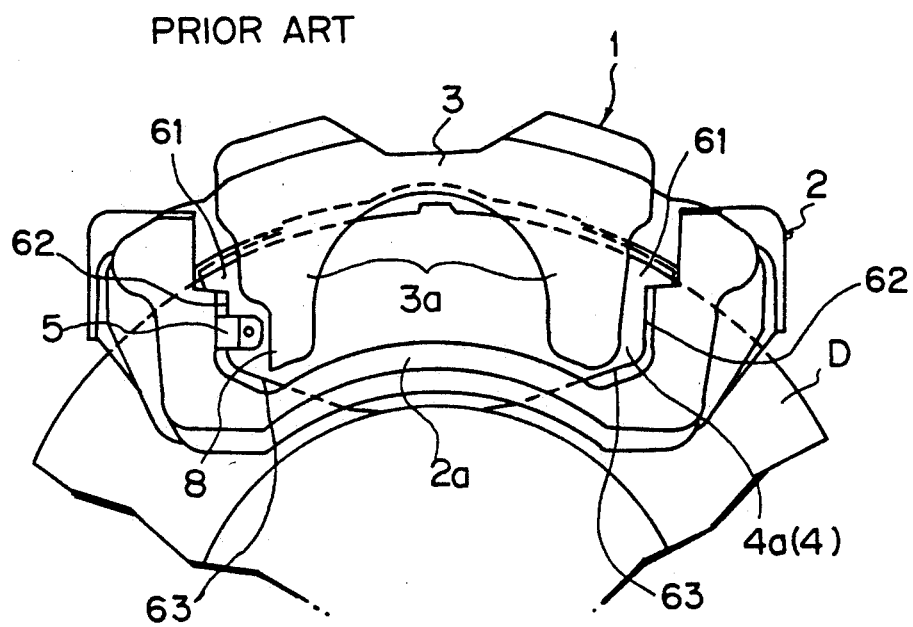
FIG. 6 is a front view of a conventional disk brake.

Referring to FIG. 6, which shows a conventional disk brake that employs a wear alarm member, a disk brake 1 comprises a carrier 2 secured to a non-rotating part of a vehicle, and a caliper 3 that is slidably supported by the carrier 2 and extends across a disk D. The caliper 3 is slidable in a direction parallel to the axis of rotation of the disk D. The carrier 2 is formed with an outer beam 2a as an integral part thereof, which connects together the side portions of the carrier 2 for the purpose of increasing the rigidity thereof. The side portions of the carrier 2 extend across the disk D from positions spaced from each other along the periphery of the disk. Since the structures of the carrier 2, the caliper 3 and the carrier outer beam 2a and the correlation between these members are known, a detailed description thereof is omitted.

The disk brake 1 further has a pair of pads 4 and 4a which are slidably supported by the carrier 2 at respective positions which face each other across the disk D, the pads 4 and 4a being slidable in a direction parallel to the axis of rotation of the disk D. In FIG. 6, only one pad 4a is shown; the other pad 4 is present at the other side of the disk D. When the caliper 3 presses the pads 4 and 4a against the disk D, friction occurs between the pads 4 and 4a on the one hand and the disk D on the other, thereby braking the wheel, and thus decelerating the speed of the vehicle.

Figure 7:
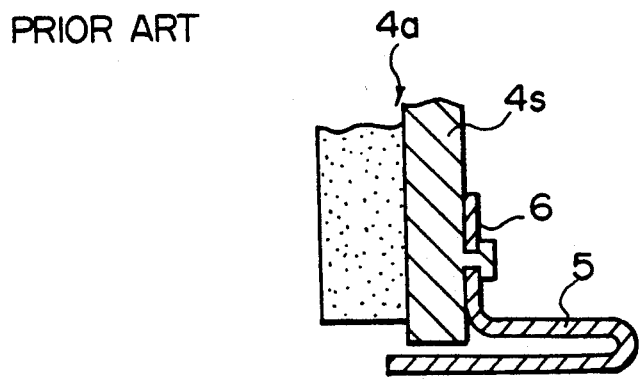
FIG. 7 is a sectional side view of a wear alarm member used in the prior art shown in FIG. 6.

More particularly, each of the pads 4 and 4a includes a support plate 4s as shown in FIG. 7. The support plate 4s has lugs 61 on the opposite side portions thereof. The lugs are supported by guide means on the carrier 2 for sliding movement in the axial direction. The support plate 4s also has side surfaces 62 which bear against associated surface portions on the carrier when the pad is displaced in the circumferential direction due to friction between itself and the disk D during braking. The support plate 4s also has bottom surfaces 63 each of which extends in a direction intersecting the radial direction of the disk.

In the disk brake 1, a wear alarm member 5 is attached to the pad 4a, which is disposed at the side of the disk D which is closer to claw portions 3a formed on the caliper 3. As shown in FIG. 7, the wear alarm member 5 is mounted in such a manner that a mounting portion 6 thereof is secured to the support plate 4s of the pad 4a by means of caulking in the vicinity of the side edge of the pad 4a. The wear alarm member 5 has a configuration in which a portion thereof that is contiguous with the mounting portion 6 is bent to extend away from the disk D over a predetermined distance and then is turned back toward the disk D. That is, by forming the wear alarm member 5 in the described configuration, the effective length is increased to insure a favorable vibrating condition when the wear alarm member 5 comes in contact with the disk D. According to the wear alarm member 5, when the brake is activated in a state where the pad 4a has become worn, the distal end of the wear alarm member 5 contacts the disk D. Consequently, the alarm member 5 vibrates and produces sound, thereby informing the driver of the wear of the pad 4a.

In the case of the wear alarm member 5, which partly extends away from the disk D, as described above, the place where the wear alarm member 5 is attached is limited to the vicinity of the side edge of the pad 4a because the outer beam 2a is provided on the carrier 2. In addition, a relief 8 must be formed in the claw portion 3a of the caliper 3 in order to allow the wear alarm member 5 to be attached in the vicinity of the side of the pad 4a. Accordingly, the forming die for producing the caliper 3 must be modified or replaced with a new one, which invites an increase in the cost.

One embodiment of the disk brake according to the present invention will be described below with reference to FIGS. 1 and 2, in which portions or members having the same structures as those in the prior art are denoted by the same reference numerals, and a description thereof is omitted.

Figure 1:
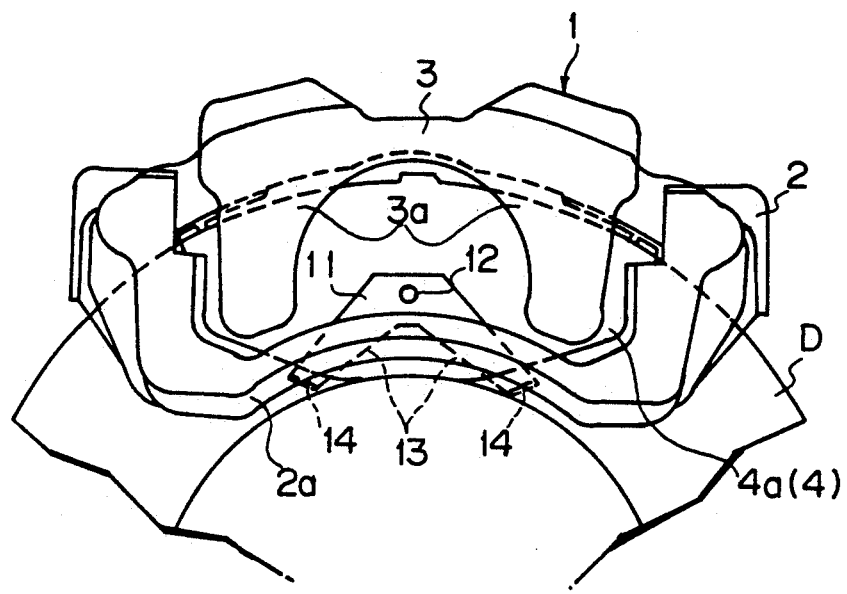
FIG. 1 is a front view of one embodiment of the disk brake according to the present invention.
Figure 2:
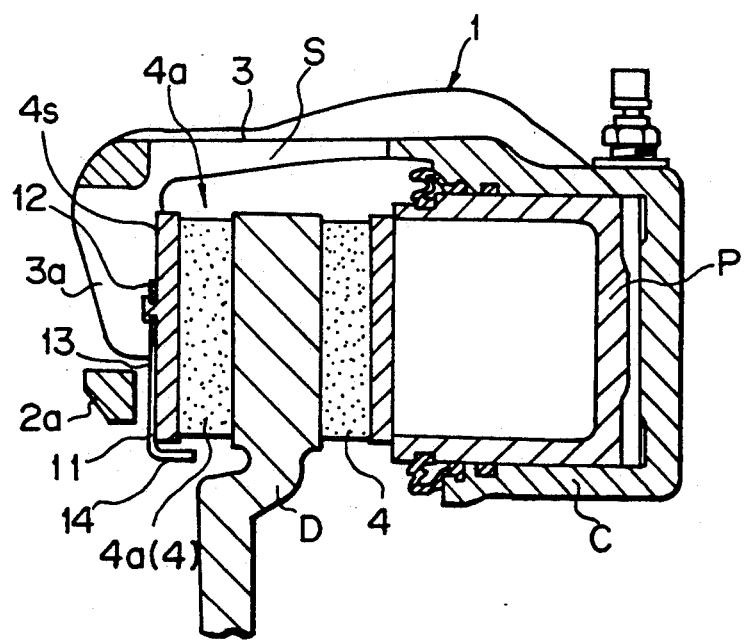
FIG. 2 is a sectional side view of the embodiment of the disk brake according to the present invention.

Referring to FIGS. 1 and 2, a wear alarm member 11 is attached to the support plate 4s for the pad 4a of the disk brake 1 at a position inbetween the claw portions 3a of the caliper 3. As shown in FIGS. 3A to 3C, the wear alarm member 11 comprises a mounting portion 12, a pair of vibrating pieces 13 extending from the mounting portion 12 in a V shape, and contact portions 14 which are formed by the respective bent distal end portions of the vibrating pieces 13.

The wear alarm member 11 is mounted in such a manner that the mounting portion 12 is secured to the support plate 4s of the pad 4a by means of caulking and the vibrating pieces 13 each extend from the mounting portion 12 radially inward of the disk D in a direction intersecting the radial direction of the disk D along the surface of the support plate 4s of the pad 4a in the area between the outer beam 2a of the carrier 2 and the pad 4a, with the contact portions 14 extending toward the disk D at respective positions near the left and right end portions of the pad 4a.

As shown in FIG. 2, the caliper 3 is formed with a cylinder portion C that accommodates a piston P, a disk-pass portion S extending across the disk and claw portions 3a. When the brake is activated, a working fluid is supplied into the cylinder C through a pipe fitting (not shown) to press the piston P toward the disk D. Consequently, the pads 4 and 4a are pressed against the disk D by the force applied by the piston P and the reaction acting on the claw portions 3a of the caliper 3, thus a braking force.

When the pad 4a has worn a predetermined amount in the disk brake 1 provided with the wear alarm member 11, the contact portions 14 of the wear alarm member 11 come in contact with the disk D when the brake is activated, and the vibrating pieces 13 of the wear alarm member 11 vibrate and produce sound, thereby informing the driver of the wear of the pad 4a.

In addition, the above-described arrangement of the disk brake 1 enables the vibrating pieces 13 of the wear alarm member 11 to be vibrated with certainty when the contact portions 14 come in contact with the disk D. More specifically, since the vibrating pieces 13 of the wear alarm member 11 extend in a direction intersecting the radial direction of the disk D along the support plate 4s in the area between the outer beam 2a of the carrier 2 and the pad 4a, a length adequate to generate vibration can be ensured for each vibrating piece 13 extremely easily. In addition, it is possible to eliminate the need to bend the intermediate portion of the wear alarm member so as to extend away from the disk D for the purpose of ensuring the required length as in the conventional wear alarm member 5. Consequently, it is possible to eliminate the need to form a relief 8 in a claw portion 3a of the caliper 3 and hence the need to produce a new die for forming a caliper with a relief 8. In other words, the caliper 3 can be formed by using the existing forming die, and it is possible to eliminate the increase in the cost due to the production of a new forming die.

In addition, in the wear alarm member 11 the pair of vibrating pieces 13 extend in a V shape, and the contact portions 14 are bent toward the disk D at the left and right end portions of the pad 4a. Therefore, even if the pad 4a is unevenly worn, the wear of the pad 4a can be detected with either of the left and right contact portions 14. Thus, the disk brake 1 is extremely excellent in providing safety.

Even if the contact portions 14 contact the disk D and induce the wear alarm member 11 to rotate, since the contact portions 14 are retained by the end portions of the pad 4a, the rotation of the wear alarm member 11 can be prevented. For example, if the member 11 is caused to rotate clockwise as viewed in FIG. 1, the left-hand contact portion 14 engages with the side edge of the pad 4a. In other words, the contact portions 14 also serve as detents for the wear alarm member 11. In addition, when the wear alarm member 11 is to be mounted, it can be reliably positioned by using the contact portions 14 as guides, so that the assembling efficiency can also be improved.

In another embodiment of the present invention, the distal end portions of the wear alarm member 11 are shaped as shown in FIG. 4. In this embodiment, the contact portions 14 constitute plate portions extending normal to the direction of movement of the disk D. In other words, the plate portions 14 extend in radial directions of the disk. The volume or frequency of sound produced by the vibration of the vibrating pieces 13 can be adjusted by thus varying the configuration of the distal end portions of the wear alarm member 11.

Although in the foregoing embodiment the wear alarm member 11 has a pair of vibrating pieces 13 formed in a V shape as a whole so that wear can be detected at both the left and right end portions of the pad 4a, the wear alarm member 11 is not necessarily limited to the configuration described. For example, in an embodiment shown in FIG. 5 the wear alarm member 11 has a single vibrating piece 13. In this case also, the vibrating piece 13 can be made adequately long by extending it in a direction intersecting the radial direction of the disk, that is, at an angle to the radial direction.

As has been described above, the disk brake of the present invention provides the following advantages.

Since the wear alarm member has a vibrating piece which extends from the mounting portion in a direction intersecting the radial direction of the disk in the area between the outer beam of the carrier and the pad, a length required for the vibrating piece to vibrate effectively can be obtained extremely easily. Thus, it is possible to eliminate the need to extend the intermediate portion of the wear alarm member away from the disk in order to ensure the required length. In addition, since the wear alarm member is attached to the pad inbetween the claw portions, it is possible to eliminate the need to form a relief 8 in a claw portion 3a of the caliper 3 and also the need to produce a new die for forming a caliper with a relief 8. In other words, the caliper 3 can be formed by using the existing forming die, and it is possible to eliminate the increase in the cost due to the production of a new forming die.

In the embodiment wherein a pair of vibrating pieces extend toward the left and right ends of the pad, even if the contact portions contact the disk and induce the wear alarm member to rotate, the contact portions are retained by the end portions of the pad, thus preventing the rotation of the wear alarm member. In other words, the contact portions also serve as detents for the wear alarm member. In addition, when the wear alarm member is to be mounted, it can be reliably positioned by using the contact portions as guides, so that the assembling efficiency can also be improved.

Although the present invention has been described with reference to a disk brake in which a carrier has an outer beam, it should be appreciated that the invention is applicable also to a disk brake without any outer beam. Furthermore, although both of the brake pads of the illustrated disk brake are supported by the carrier for movement in the axial direction of the disk D, the pad between the disk and the cylinder portion C of the caliper may be supported by any suitable non-rotating portion of a vehicle.

What is claimed is:

1. A disk brake for a vehicle including a rotary disk having opposite sides, said disk brake comprising:
   a carrier mounted on a non-rotating part of the vehicle on one of the opposite sides of the disk, said carrier including side portions spaced from each other along the circumference of the disk and extending across the disk, and an outer beam located at the other of said opposite sides of the disk and connecting said side portions;
   a caliper supported by said carrier for sliding movement in the axial direction of the disk and including a cylinder portion on said one of the opposite sides of the disk, a piston received in the cylinder portion, a disk-pass portion extending from the cylinder portion across the disk, and two claw portions extending from the disk-pass portion on said other of the sides of the disk, said claw portions being spaced from each other in the circumferential direction of the disk;
   a pair of brake pads disposed on the opposite sides of the disk and supported so as to be slidable in the axial direction of the disk, at least the pad disposed on said other of the sides of the disk being supported by said carrier;
   a wear alarm member comprising a plate fixed relative to the pad on said other of the sides of the disk, said alarm member having a mounting portion at which the alarm member is fixed relative to said pad at a location between said claw portions, and at least one vibrating piece extending from the mounting portion and having a distal end remote from said mounting portion, said vibrating piece extending from said mounting portion in a direction intersecting a line extending radially of the disk along said pad and located in an area between said pad and said outer beam of the carrier, said vibrating piece remaining spaced from said claw portions when the brake is actuated so that the vibrating piece does not interfere with said claw portions when the brake is actuated, said distal end of the vibrating piece being a bent portion of the vibrating piece extending toward the disk at the periphery of said pad so as to contact said disk when the pad wears a certain amount, the entire said bent portion constituting the distal end of said vibrating piece being located between said disk and a plane passing through said mounting portion parallel to said disk.

2. A disk brake according to claim 1, wherein said at least one vibrating piece comprises a pair of vibrating pieces that extend from said mounting portion in diverging directions each intersecting a line extending radially of the disk.

3. A disk brake according to claim 1, wherein said bent portion lies in a plane parallel to a radial direction of the disk.

4. A disk brake for a vehicle including a rotary disk having opposite sides, said disk brake comprising:
   a carrier mounted on a non-rotating part of the vehicle on one of said opposite sides of the disk;

a caliper supported by said carrier for sliding movement in the axial direction of the disk and including a cylinder portion on said one of the sides of the disk, a piston received in the cylinder portion, a disk-pass portion extending from the cylinder portion across the disk, and two claw portions extending from the disk-pass portion on said other of the sides of the disk, said claw portions being spaced from each other in the circumferential direction of the disk;

a pair of brake pads disposed on the opposite sides of the disk and supported so as to be slidable in the axial direction of the disk, at least the pad disposed on said other of the sides of the disk being slidably supported by said carrier;

a wear alarm member comprising a plate and fixed relative to the pad on said other of the sides of the disk, said alarm member having a mounting portion at which the alarm member is fixed relative to said pad at a location between said claw portions, and a pair of vibrating pieces extending from said mounting portion in diverging directions each of which directions intersects a respective line extending radially of the disk, said vibrating pieces remaining spaced from said claw portions in the location between said claw portions when the brake is actuated so that the vibrating pieces will not interfere with said claw portions when the brake is actuated, and said vibrating pieces having respective distal ends being bent portions of the vibrating pieces extending toward the disk at the periphery of said pad so as to contact said disk when the brake pad wears a certain extent, the entire said bent portion of each of said vibrating pieces being located between said disk and a plane passing through said mounting portion parallel to said disk.

5. A disk brake according to claim 4, wherein the bent portion of each of said vibrating pieces lies in a plane parallel to a radial direction of the disk.

* * * * *